United States Patent
Roth et al.

(10) Patent No.: US 10,924,482 B1
(45) Date of Patent: Feb. 16, 2021

(54) VIRTUAL SERVICE AUTHORIZATION

(71) Applicant: Amazon Technologies, Inc., Seattle, WA (US)

(72) Inventors: Gregory Branchek Roth, Seattle, WA (US); Eric Jason Brandwine, Haymarket, VA (US); Graeme David Baer, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/576,141

(22) Filed: Dec. 18, 2014

(51) Int. Cl.
*H04L 29/06* (2006.01)
*G06F 21/62* (2013.01)

(52) U.S. Cl.
CPC .......... *H04L 63/0892* (2013.01); *H04L 63/10* (2013.01); *H04L 63/12* (2013.01); *G06F 21/62* (2013.01); *G06F 2221/2141* (2013.01)

(58) Field of Classification Search
CPC .......................... G06F 2221/2141; H04L 63/10
See application file for complete search history.

(56) References Cited

U.S. PATENT DOCUMENTS

| | | | | |
|---|---|---|---|---|
| 6,523,172 B1* | 2/2003 | Martinez-Guerra | .... | G06F 8/427 704/9 |
| 6,845,452 B1* | 1/2005 | Roddy | ..................... | H04L 63/02 709/223 |
| 7,509,489 B2* | 3/2009 | Kostal | ..................... | G06F 21/33 713/156 |
| 8,321,337 B2* | 11/2012 | Fenlon | ................. | G06Q 20/102 705/35 |
| 9,015,320 B2* | 4/2015 | Rice | ...................... | G06F 9/5055 709/225 |
| 9,092,440 B1* | 7/2015 | Wen | ................... | G06F 17/30067 |
| 2003/0154401 A1* | 8/2003 | Hartman | ................. | H04L 63/20 726/30 |
| 2006/0004726 A1* | 1/2006 | Blank | ................... | G06F 16/258 709/246 |
| 2006/0242189 A1* | 10/2006 | Leetaru | ................. | G06F 16/972 |
| 2007/0150722 A1* | 6/2007 | Aaron | ..................... | H04L 63/10 713/155 |
| 2008/0178278 A1* | 7/2008 | Grinstein | ............ | H04L 63/0227 726/12 |
| 2010/0205475 A1* | 8/2010 | Ebrahimi | ............ | G06F 21/6227 714/2 |
| 2012/0197963 A1* | 8/2012 | Bouw | ................... | G06F 16/258 709/202 |
| 2013/0065618 A1* | 3/2013 | Long | ................... | H04L 67/2823 455/466 |
| 2013/0166703 A1* | 6/2013 | Hammer | ................. | H04L 41/50 709/220 |
| 2013/0318152 A1* | 11/2013 | Iyer | ........................ | G06F 9/541 709/203 |
| 2015/0207856 A1* | 7/2015 | Bersin | ................. | H04L 41/0803 709/204 |

\* cited by examiner

*Primary Examiner* — Madhuri R Herzog
(74) *Attorney, Agent, or Firm* — Davis Wright Tremaine LLP

(57) ABSTRACT

A computing resource service provides flexible configuration of authorization rules. A set of authorization rules which define whether fulfillment of requests. The set of authorization rules are applied to a request of a first type which is mapped to a request of a second type. The request of the second type is used for fulfillment of the request of the first type when the authorization rules so allow.

22 Claims, 7 Drawing Sheets

VIRTUAL SERVICE AUTHORIZATION

BACKGROUND

The use of network computing, storage, and other computing resources has proliferated in recent years. The resources for network computing and storage are often provided by computing resource service providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource service providers. The usage of such infrastructure-as-a-service along with platform-as-a-service services allows content providers and online merchants, among others, to efficiently and adaptively satisfy their computing needs and other resource usage needs, whereby the computing and storage resources used by the content providers and online merchants may be added or removed from a large pool provided by a computing resource service provider as needed and depending on their needs.

Customers of computing resources hosted by a computing resource service provider (often referred to as "cloud services" consumed from a "cloud provider," respectively), may use various infrastructure-as-a-service (IaaS) other services to construct elaborate computer systems to support their operations. At the same time, usage of a service provider's services often requires systems to be programmed within constraints of an application programming interface (API) provided by the service provider. For instance, a request for data from a data storage service is often required to be formatted in accordance with the API of the service. At the same time, with any given customer system, a different formatting of requests may be more convenient for the customer. For instance, a data storage service may be used by the customer for multiple purposes. Tracking permissions to avoid unauthorized access to data can become complex and confusing. For example, an administrator may give a user a wide range of permissions to the data storage service, not realizing the other uses of the data storage service for the customer. Thus, without proper care being taken, the user may, therefore, be unintentionally given access to data that the user is not authorized for. Generally, the modeling of permissions of a computing resource service provider may, at times, not be a good match to the way the resources are used by customers of the service provider.

BRIEF DESCRIPTION OF THE DRAWINGS

Various embodiments in accordance with the present disclosure will be described with reference to the drawings, in which.

DETAILED DESCRIPTION

Figure 1:
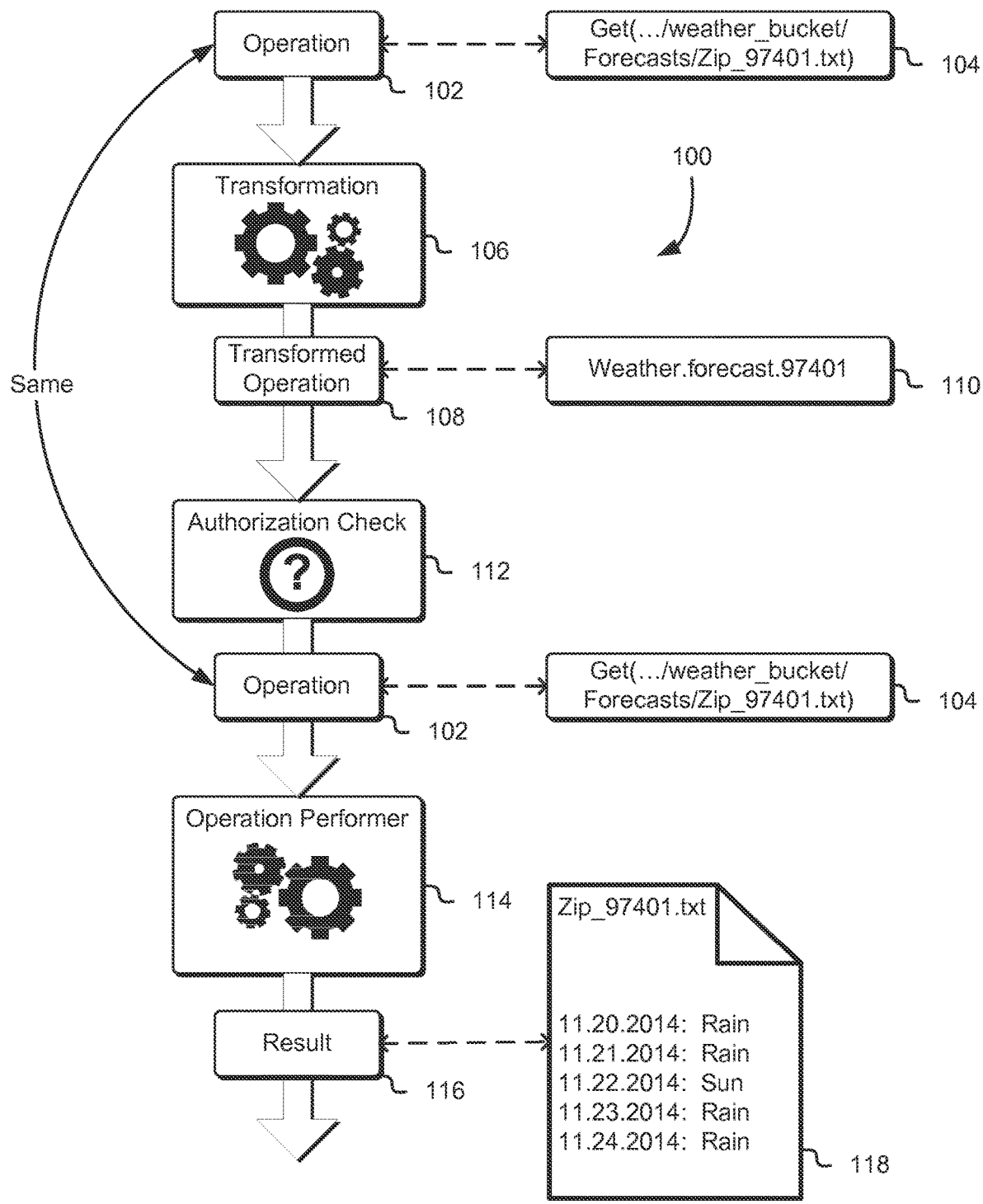
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods to provide robust authorization configurability with flexibly backed application programming interface requests. In an embodiment, a computing resource service provider provides an API that enables customers of the service provider to define custom requests that can be submitted to the service provider to be processed by the service provider. As an illustrative example, a customer of the service provider may utilize computing resources hosted by the service provider to run its own service, such as a service that collects, processes, and provides weather data. The customer may use a data storage service of the service provider to store weather data. In some embodiments, the weather data may be accessible via an API call (request) to the data storage service. However, an API of the data storage service or another service of the service provider may allow the customer to define a custom API call that can be made to retrieve the same data, where the custom API call may be formatted in a way that does not comply with a syntax supported natively by the service provider.

To achieve such flexibility, the service provider may store request-mapping rules (also referred to as simply mapping rules) that define how requests map to each other. The request-mapping rules may define matches between requests types and also how parameters (generally, attributes) of one request type map to parameters of another request type. Generally, the request-mapping rules may define how to construct one request from another request. As an illustrative example, a request (a customer request) may have a syntax that is specific to a customer's application. Request-mapping rules applicable to the request may define a transformation of the request into a request of a syntax supported by a service of the service provider (a service provider request). Such a transformation may map parameters of the customer request to parameters of the service provider request and otherwise indicate how to populate a service provider request, such as by indicating which parameters of the customer request to ignore, how to transform (e.g., by way of a mathematical function) parameters, and/or parameters to add to the service provider request that do not have corresponding parameters in the customer request.

Techniques of the present disclosure also allow for flexible definition of privileges with respect to customer-defined request types. For example, in an embodiment, an application programming interface of the service provider allows customers to define authorization rules for custom-defined requests. In this manner, customers can define privileges for privileges using terminology specific to their applications. As an illustrative example, a customer may, through API calls, define rules for when a customer request (i.e., a request defined by the customer) is to be fulfilled by the service provider. Such rules may define conditions that are based on the customer request type and references for corresponding resources, in terms of how the customer refers to the resources, which may differ from how the service provider refers (identifies) the resources. Such rules may allow for access to resources (i.e., may define permissions for accessing resources) that are not otherwise available. In other words, absent authorization rules applicable to custom-define API calls, certain principals may lack access rights for accessing corresponding resources. The service provider may utilize computer systems configured to apply authorization rules to the custom-defined APIs of the customer, thereby enabling the service provider to enforce such rules on behalf of the customer.

Numerous variations of such techniques are considered as being within the scope of the present disclosure. In some examples, a service of a service provider is configured with servers that receive requests configured in a syntax supported by the service. When a request to access a resource is received by such a server, data stored in association with the resource may indicate to the server that the request corresponds to a custom-defined request and that a determination whether fulfillment of the request is authorized should be determined using the custom-defined request. The server may then use mapping rules to determine a corresponding custom-defined request and may apply any applicable authorization rules to the determined custom-defined request. The server may then operate in accordance with whether fulfillment of the custom-defined request is determined to be authorized. If determined to fulfill the request, the server may use the resource associated with the request that was received.

In other examples, the service provider is configured to receive custom-defined requests. A server of a service, for example, may receive requests in custom-defined syntaxes or in a syntax supported by the service natively. As another example, another service or a network device in front of a server of a service may be configured to receive custom-defined requests. The system that receives such a request may apply any applicable authorization rules to the request and proceed accordingly. If the system determines to fulfill the request, the system may use request-mapping rules to construct a request in a syntax supported by the service. The request may then be transmitted to the service for fulfillment. Other variations, including those discussed in more detail below, are considered as being within the scope of the present disclosure.

Note that, while the present disclosure uses customer-defined API calls for the purpose of illustration, various techniques of the present disclosure can be used in other contexts. For instance, a computing resource service provider may have multiple services and some services may be backed by other services. For instance, with a first service backed by a second service (such as the first service being a virtual overlay of the second service), the techniques described herein can be used to define, in terms of types of API calls that may be made to the first service, authorization rules for access control to resources hosted by the second service. For instance, data resulting from the first service may be stored in the second service and access to such data may be controlled using authorization rules applicable to API calls that may be made to the first service.

FIG. 1 shows a diagram illustrating various aspects of the present disclosure. In an embodiment, a computer system receives a first representation 102 of an operation. The computer system may be, for instance, configured to provide an application programming interface (API) and the first representation may be a web server of the computer system.

The representation 102 of the operation may be in the form of an API request (also referred to as an API call) to perform the operation. As an illustrative example, the representation of the operation may be a "get" request 104 formatted with a syntax supported by a data storage service, where a get request is a request whose fulfillment includes the retrieval of data specified by the request. In this illustrative example, the get request 104 may specify a path that serves as an identifier for a data object to be retrieved as fulfillment of the get request. In other words, the first representation 102 of the operation may be in form of an application program interface request formatted in accordance with a syntax supported by a system in which the representation is submitted. The system may support the syntax by being configured to receive the request formatted in accordance with the syntax and fulfill the request accordingly.

Once the representation 102 of the operation has been received, a system that received the representation 102 of the operation may cause a transformation 106 to be performed, thereby resulting in a transformed representation of the operation. As noted above, the representation 102 of the operation may be an application programming interface request that involves access to a computing resource. The transformed representation 108 of the operation may be in a request formatted using a different syntax and whose fulfillment involves access to a resource identified in another way. For example, as illustrated in FIG. 1, an example second representation 110 shows a request in the form a different syntax than the get request 104. In this illustrative example, the second example does not include the path serving to identify a data object to be retrieved as part of fulfillment of a request.

Once the transformed operation has been determined 108, a system that received the representation 102 of the operation may cause an authorization check 112 to be performed. An authorization check may be a determination whether fulfillment of the request representing by the representation 102 of the request complies with any policies (which may be collectively referred to as "policy") applicable to the request. In an embodiment, the authorization check 112 however is made using the transformed representation 108 of the operation. For instance, the system performing the authorization check may apply a set of authorization rules to the transformed request, where fulfillment of the request requires satisfaction of the authorization rules applicable to the request. Conditions of the authorization rules may be configured in terms of the transformed request and/or in terms of the different identifier for the applicable resource (in this illustrative example, a data file). Application of the authorization rules to the untransformed request may result in an error or incorrect evaluation.

If the authorization check 112 results in a determination that fulfillment of the request should not occur, that is fulfillment of the request is not authorized by applicable policy, the request may be denied. As illustrated in FIG. 1 however, if the authorization check 112 indicates that the request should be fulfilled then the system that received the representation 102 of the operation may cause the operation to be performed. In an embodiment, the system causes the operation to be performed using the representation 102 that was initially received, that is, the representation 102 that is different from the representation 104 against which the authorization check 112 was performed. The representation 102 of the operation may be processed by processing the representation 102 of the operation in accordance with a syntax of the representation 102 of the operation. An operation performer 114 may then perform the operation to fulfill the request encoded by the representation 102 of the operation. The operation performer may be a computer system such as a distributed system that is configured to provide a service of a service provider, which may involve a backend system, described in more detail below. Generally the operation performer may be the same system that received the representation 102 of the operation and/or another system. Once the operation has been performed by the operation performer 114, a result 116 may be provided as illustrated in FIG. 1. An example of such result is a file 118 identified by the path in the representation 104 of the get request.

Variations of the techniques discussed above in connection with FIG. 1 are also within the scope of the present disclosure. In some embodiments, for example, the direction of the transformation is reversed. In such embodiments, a representation of a request may be received and an authorization check may then be made against the representation of the request that was received. Upon successful determination that fulfillment of the request is authorized, the representation of the request may be transformed to another representation of the request and the other representation of the request may then be used to cause the request to be fulfilled. Additional detail is provided below.

Figure 2:
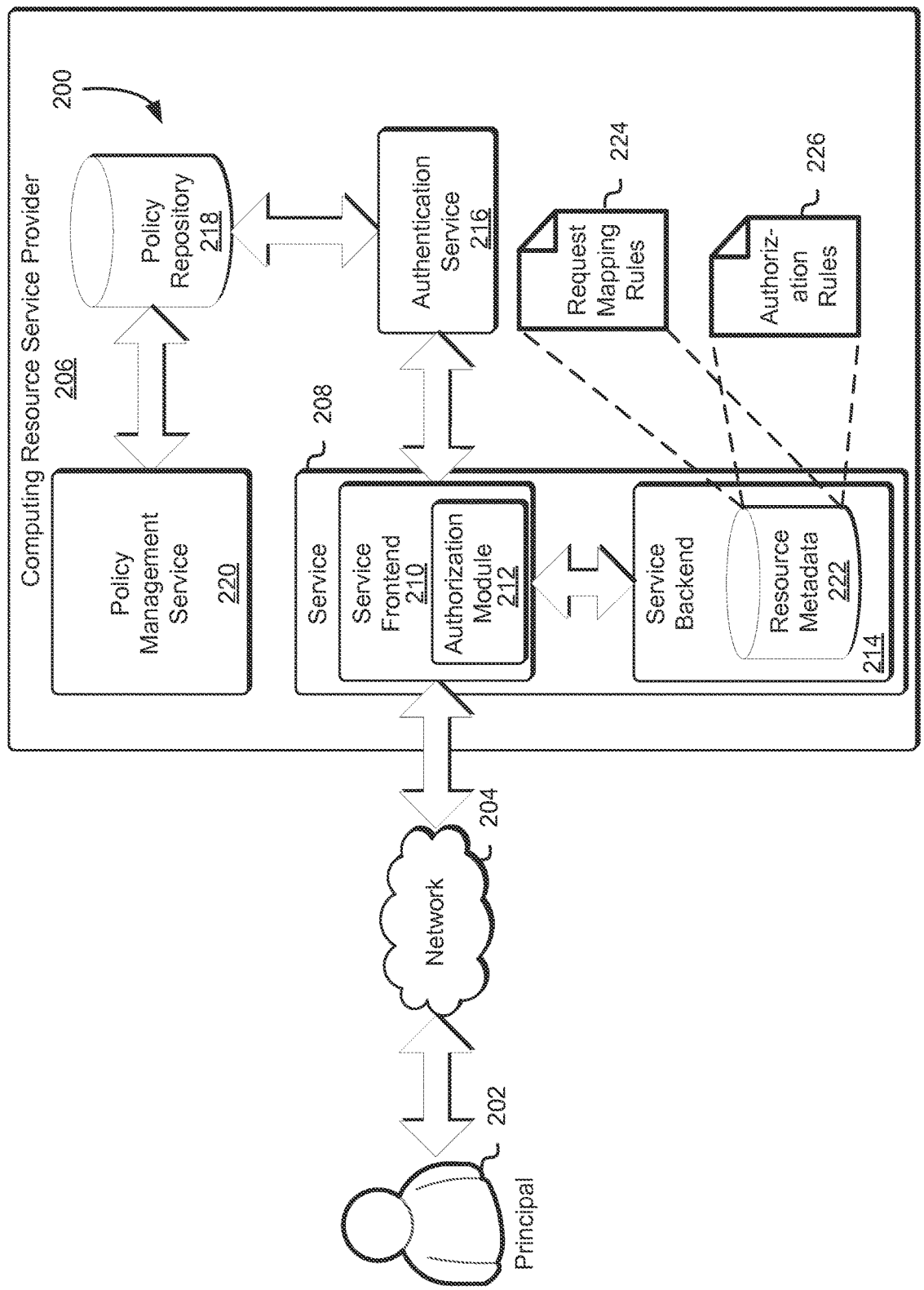
FIG. 2 shows an illustrative example of an environment in which various embodiments can be practiced.

FIG. 2 is an illustrative example of an environment 200 in which various embodiments of the present disclosure can be practiced. In an embodiment, a principal 202 may use a computing device to communicate over a network 204 with a computing resource service provider 206. Communications between the computing resource service provider 206 and the principal 202 may, for instance, be for the purpose of accessing a service 208 operated by the service provider 208, which may be one of many services operated by the service provider 206. The service 208 may comprise a service frontend 210 and a service backend 214. The principal 202 may issue a request for access to a service 208 (and/or a request for access to resources associated with the service 208) provided by a computing resource service provider 206. The request may be, for instance, a web service application programming interface request. The principal may be a user, or a group of users, or a role associated with a group of users, or a process representing one or more of these entities that may be running on one or more remote (relative to the computing resource service provider 206) computer systems, or may be some other such computer system entity, user, or process. Generally, a principal is an entity corresponding to an identity managed by the computing resource service provider, where the computing resource service provider manages permissions for the identity.

The principal 202 may correspond to an identity managed by the computing resource service provider 206, such as by the policy management service or another service. The identity may be one of multiple identities managed for an account of a customer of the computing resource service provider, and the computing resource service provider may manage accounts for multiple customers. Note that, while the principal 202 may correspond to a human, such a human may communicate with the computing resource service provider 206 through a suitably configured computing device which may perform operations (e.g., generation and transmission of requests) on behalf of the principal 202. The principal 202 may communicate with the computing resource service provider 206 via one or more connections (e.g., transmission control protocol (TCP) connections). The principal 202 may use a computer system client device to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments. Note that such services and resources are provided for the purpose of illustration and embodiments of the present disclosure may utilize other services and/or resources.

The request for access to the service 208 which, in some examples, is a web service application programming interface request (also referred to simply as a web service request), may be received by a service frontend 210, which, in some examples, comprises a web server configured to receive such requests and to process them according to one or more policies associated with the service 208. The request for access to the service 208 may be a digitally signed request and, as a result, may be provided with a digital signature. The service frontend 210 may then send the request and the digital signature for verification to an authentication service 216. The authentication service 216 may be a stand-alone service or may be part of a service provider or other entity. The authentication service 216, in an embodiment, is a computer system configured to perform operations involved in authentication of principals. In some examples, requests submitted to the service frontend 210 are digitally signed by the principal (i.e., by a computing device used by or operating on behalf of the principal) using a symmetric cryptographic key that is shared between the principal 202 and the authentication service 216. The authentication service, therefore, may use a copy of the symmetric cryptographic key to verify digital signatures of requests purported to have been generated by the principal 202. However, in other embodiments, the authentication service 216 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 202 corresponding to the private cryptographic key. Consequently, in some embodiments, the authentication service may use a public cryptographic key specified by the certificate. Generally, the authentication service may utilize a cryptographic key that is registered with the authentication service 216 in association with the principal 202.

Upon successful authentication of a request, the authentication service 216 may then obtain policies applicable to the request. A policy may be applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216 may transmit a query to a policy repository 218 managed by a policy management service 220, which may be the policy management service discussed above in connection with FIG. 1. The query may be a request comprising information sufficient to determine a set of policies applicable to the request. The query may, for instance, contain a copy of the request and/or contain parameters based at least in part on information in the request, such as information identifying the principal, the resource, and/or an action (operation to be performed as part of fulfillment of the request). The policy repository, which may be a database or other system operable to process queries, may process the query by providing any policies applicable to the request. Note that, if authentication of the request is unsuccessful (e.g., because a digital signature could not be verified), policies applicable to the request may not be obtained.

Having obtained any policies applicable to the request, the authentication service 216 may provide an authentication response and, if applicable (e.g., when there is a positive authentication response), the obtained policies back to the service frontend 210. The authentication response may indicate whether the response was successfully authenticated. The service frontend 210 may then check whether the fulfillment of the request for access to the service 208 would comply with the obtained policies using an authorization module 212.

An authorization module 212 may be a process executing on the service frontend that is operable to compare the request to the one or more permissions in the policy to determine whether service is authorized to satisfy the request (i.e., whether fulfillment of the request is authorized). For example, the authorization module may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also by select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network.

In an embodiment, the service backend 214 maintains a repository 222 of resource metadata (resource metadata repository), which may include request-mapping rules 224 and authorization rules 226. While illustrated as a single repository, the request-mapping rules 224 and the authorization rules 226 may be maintained in separate repositories. Further, while the request-mapping rules 224 and the authorization rules 226 are illustrated separately, the request-mapping rules 224 and the authorization rules 226 may be maintained together (e.g., a set of request-mapping rules and a set of authorization rules 226 for a resource may be maintained in the same database record). The request-mapping rules 224 and the authorization rules 226 may be maintained in metadata that is maintained in association with a resource. Accordingly, multiple resources may each have a corresponding set of request-mapping rules and authorization rules 226. Thus, identification of a specific resource enables location of corresponding request-mapping rules and authorization rules. As an illustrative example, the service 208 may be a data storage service that stores data objects and that organizes data objects according to logical data containers (also referred to as "buckets"). The data objects themselves and the logical data containers may each be resources managed by the service 208. The resource metadata repository 222 may, for multiple logical data containers and/or data objects, store a set of request-mapping rules 224 and authorization rules 226 in association with each logical data container and/or data object. Note that a set of request-mapping rules and a set of authorization rules may be associated with a data object indirectly by way of an association with a logical data container in which the data object is stored (i.e., by way of an association with a logical data container with which the data object is associated).

The request-mapping rules, in an embodiment, may be configured to enable determination of a request (a representation of an operation) from another request (another representation of the operation). Generally, the authorization module may be configured with programming logic that is configured for applying the request-mapping rules to requests. For instance, the request-mapping rules may specify how to transform a request in a syntax natively supported by the service 208 (e.g., a request that the service frontend 210 is configured to process) to another request which may not be supported by the service 208, such as a request of a syntax specified by a customer of the computing resource service provider for an application specific to the customer. Generally, the request-mapping rules 224 operate as a definition of a transformation from one request to the other, where inputs to the transformation include a type of request (e.g., the specific type of API call being made by the request) and any parameters of the request. The transformation may transform one request type to the other and may transform parameters of the request to parameters suitable for the other. The transformation of parameters may, in some instances, be an identity transformation while, in other cases, the values of parameters may change as a result of transformation. In some instances, the transformation of a request may result in fewer parameters (e.g., some parameters of the input request being ignored) and/or additional parameters. In other words, in some instances, there may not be a one-to-one correspondence between parameters of the request being transformed and the result of the transformation.

The authorization rules 226 may be rules that are configured to be applied to requests that have been transformed in accordance with request-mapping rules 224. For example, the authorization module may be configured with programming logic that enables the authorization module to apply authorization rules to requests in a syntax (or syntaxes) of requests resulting from transformation in accordance with the request-mapping rules 224. The authorization rules may specify conditions that must be satisfied for request fulfillment to be authorized. The conditions may be combined in complex ways, such as by using Boolean operators such as "AND," "OR," "BUT NOT," and any other applicable operators.

The service frontend 210 may be configured to, when a request is received from the principal 202, query the service backend 214 for any applicable request-mapping rules 224 and authorization rules 226. If the service backend 214 returns any request-mapping rules 224 and authorization rules 226, the service frontend 210 may provide the request-mapping rules 224 and authorization rules 226 to the authorization module 212 in addition to or instead of policies from the authentication service 216. The authorization module 212 may then apply the request-mapping rules to determine another request and apply the authorization module 212 may then apply the authorization rules to the other request. If applicable in particular embodiments, the authorization module may further apply any applicable policies from the authentication service 216.

Note that, in some embodiments, the authorization rules 226 are not stored in direct association with a resource. For example, in some examples, authorization rules are stored in association with types of transformed requests and/or with transformed identifiers of resources. In such embodiments, application of request-mapping rules may be performed to determine a transformed request (i.e., a transformed representation of an operation). The transformed request may be used to locate an applicable set of authorization rules. A corpus of authorization rules may be queried, for instance, using information from the transformed request as query parameters. Such parameters may, for instance, specify a principal, a resource, and/or an action.

Finally, if the fulfillment of the request for access to the service 208 complies with the applicable authorization rules (and/or policies), the service frontend 210 may fulfill the request using the service backend 214. A service backend 214 may be a component of the service configured to receive authorized requests from the service frontend 210 and configured to perform operations to fulfill such requests. The service frontend 210 may, for instance, submit a request to the service backend to cause the service backend 214 to perform one or more operations involved in fulfilling the request. In some examples, the service backend 214 provides data back to the service frontend 210 that the service frontend provides in response to the request from the principal 202. In some embodiments, a response to the principal 202 may be provided from the service frontend 210 indicating whether the request was allowed or denied and, if allowed, one or more results of the request.

Note that, while FIG. 2 shows a particular configuration of a distributed system of a computing resource service provider, other configurations are also considered as being considered within the scope of the present disclosure. For example, authentication and authorization determinations may be made by different components of a distributed system (e.g., the service frontend 210). As another example, applicable request-mapping rules and authorization rules may be stored in the policy repository and part of obtaining applicable policy may include application of the request-mapping rules to determine the proper authentication rules 226.

Note also that the manner in which a customer of the computing resource service provider 206 configures request-mapping rules 224 and authorization rules 226 may vary in accordance with various embodiments. For instance, in the embodiment illustrated in FIG. 2, API requests to the service 208 may be used for the purpose of defining or otherwise specifying request-mapping rules and authorization rules, which may be custom-defined by the customers in accordance with their own needs and preferences.

Figure 3:
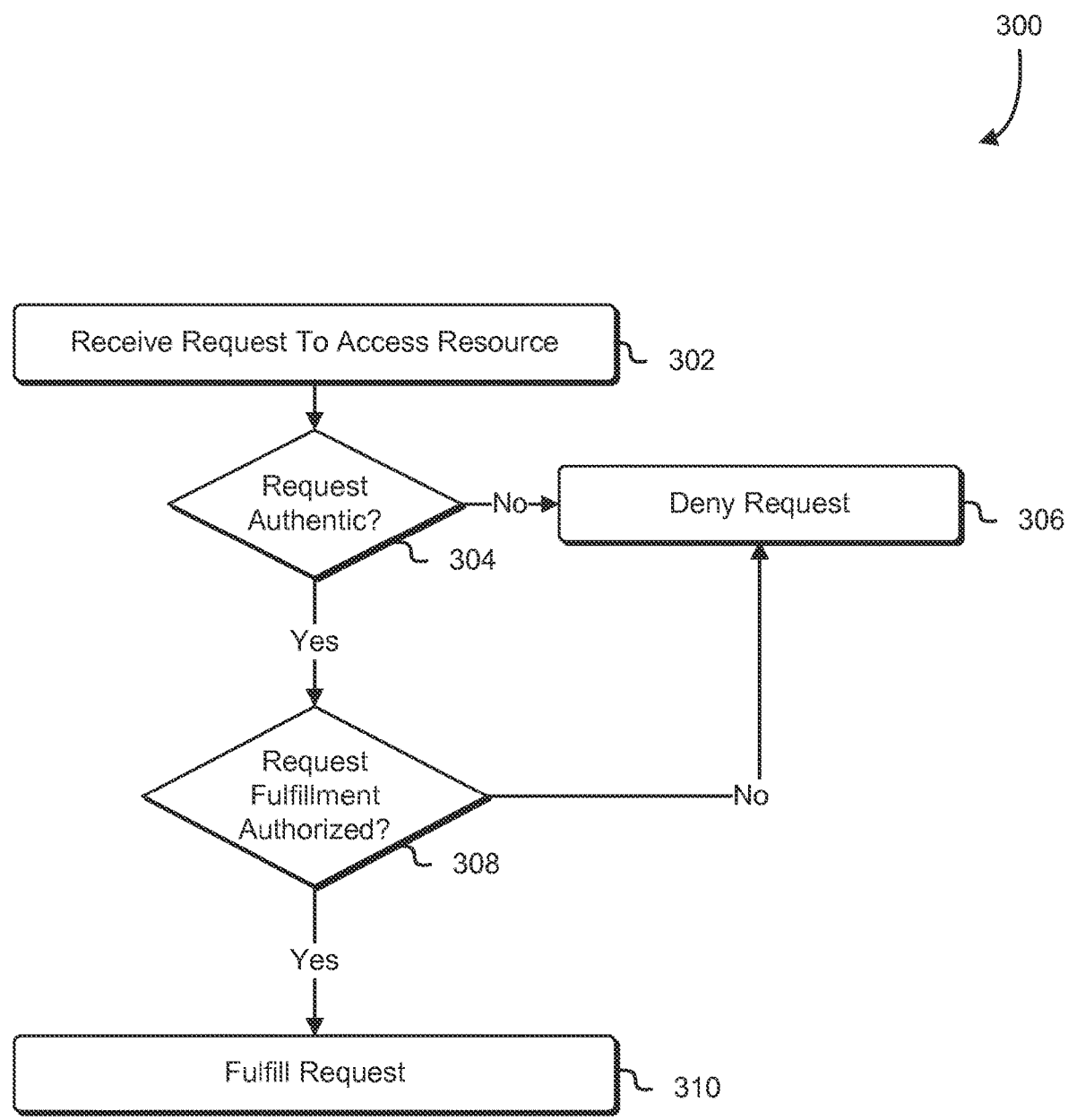
FIG. 3 shows an illustrative example of a process for processing a request in accordance with an embodiment.

FIG. 3 shows an illustrative example of a process 300 for processing requests in accordance with an embodiment. Process 300 may be performed by any suitable systems such as by a front-end server described in connection with FIG. 2. In an embodiment the process 300 includes receiving 302 a request whose fulfillment involves access of a resource. The request may be for instance an application programming interface request and may serve as a representation of an operation that is performed as part of fulfillment of the request. By involving access to a resource, the operation to be performed may involve the resource itself or information (e.g., metadata) about the resource and/or a collection of resources in which the resource is a member.

To process the request that was received 302, a system performing the process 300 may determine 304 whether the request is authentic. In an embodiment, the request purports to be submitted by an entity corresponding to an identity. The request may for example include a parameter that includes an identifier of the identity or information otherwise associated with the identity and that is useable to determine the identity. A determination whether the request is authentic may be performed by cryptographically verifying that the request was in fact submitted by the purported identity. Referring to FIG. 2, the determination may include cryptographically determining that a principal purporting to have submitted the request, in fact, authorized the request. The determination may be made by the system performing the process 300 or by causing another system to perform the cryptographic verification.

In some examples the request is digitally signed. The determination whether the request is authentic may be made by verifying a digital signature of the request using a cryptographic key associated with a principal that purportedly authorized the request to be submitted. If the digital signature of the request is correct, the digital signature therefore serves as cryptographic proof that the entity that generated the request had access to a cryptographic key held as a secret by the system that generated the request that was received 302. In some examples the digital signature is generated and verified using copies of a cryptographic key shared between an entity that generated the request and an entity operable to verify digital signatures such as the system performing the process 300 or another system such as an authentication service described above. In other examples asymmetric cryptography may be used and the digital signature may be generated using a private key of a public private key pair where the private key is held as a secret by an entity that generated the request. Generally any way by which request authenticity can be determined is considered being within the scope of the present disclosure. In an embodiment if it is determined 304 that the request is not authentic the request may be denied 306.

A determination that the request is not authentic may be made as a result of the digital signature of a request being incorrect. Such may be the case for example if the request was submitted by an entity lacking access to a cryptographic key necessary for generating the digital signature or otherwise by the digital signature having been incorrectly generated. The request may be denied 306 in various ways in accordance with various embodiments such as by providing a response to the request that was received 302 that indicates the denial. Other information may also be included with such a response such as one or more reasons for the denial to facilitate troubleshooting of a failure that occurred.

If it is determined 304 that the request is authentic, the process 300 may include determining 308 whether fulfillment of the request is authorized. A determination whether the request is authorized may be performed using various information associated with the request. As discussed above in connection with FIG. 2, the request may have been submitted by a computer system operated by a principal. One or more policies applicable to the request as a result of association of the policies with the principal, the resource, and/or in other ways may be evaluated to determine whether fulfillment of the request is authorized. The evaluation may be made using information in the request and/or contextual information that is not included in the request.

Policies that are evaluated may be obtained in various ways in accordance with various embodiments. As discussed above in connection with FIG. 2, for example, an authentication service may obtain and provide one or more policies applicable to the request where such policies are stored in a policy repository that is managed by a policy management service. Other policies may be obtained in other ways such as in association such as in a specific service that manages the resource to be accessed by fulfillment of the request. As an illustrative example, if the request involves access to data, metadata associated with the data may include one or more policies (e.g., defined by authorization rules, discussed above). Generally, determining 308, whether fulfillment of the request is authorized includes obtaining any applicable policies, obtaining information associated with the request and evaluating based at least in part on that information whether the policies allow for fulfillment of the request.

If it is determined 308 that fulfillment of the request is not authorized, the process 300 may include denying 306 the request such as described above. If however the system performing the process 300 determines 308 that fulfillment of the request is authorized by applicable policy, the request may be fulfilled 310. As noted above, the request may be fulfilled in various ways in accordance with various embodiments. In some examples, a system performing the process 300 performs any operations involved in fulfillment of the request itself. In other examples, messages may be transmitted to another system to cause the other system such as a back-end system to perform one or more operations involved with fulfillment of the request. Fulfillment of the request may include transmission of information back to the entity that submitted the request (the requester) such as a response to the request that was generated as part of fulfillment of the request.

Figure 4:
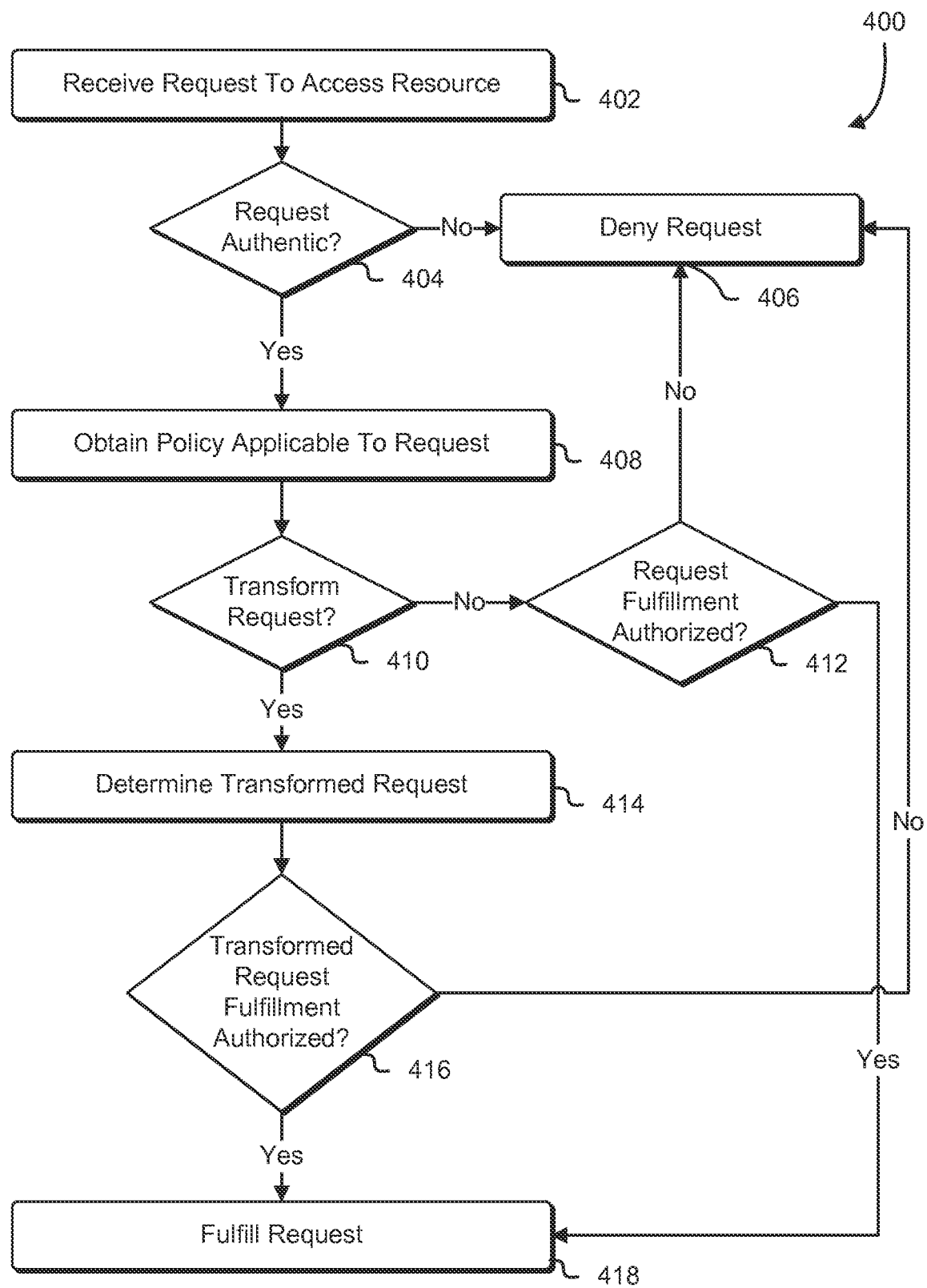
FIG. 4 shows an illustrative example of a process for processing a request in accordance with an embodiment.

FIG. 4 shows an illustrative example of a process 400 that may be performed to process a request in accordance with an embodiment. The process 400 may be performed by any suitable system such as by a front-end server of a service frontend described above in connection with FIG. 2. In an embodiment, the process 400 includes receiving 402 a request to access a resource. As noted above, the request that is received 402 may be an application program in interface request. The system performing the process 400 may determine 404 whether the request is authentic such as described above. For example, the system performing the process 400 may verify or otherwise cause to have verified a digital signature of the request that was received 402. If it is determined 404 that the request is not authentic, the process 400 may include denying 406 the request such as described above.

If it is determined 402 that the request is authentic the process 400 may include obtaining 408 policy applicable to the request. The policy may be obtained 408 in various ways in accordance with various embodiments. For example, referring to FIG. 2 the authentication service may provide any applicable policies in an authentication response that indicates that the response is authentic. As another example, a system performing the process 400 may submit a query to a policy repository such as described above. The system may generate the query to cause results applicable to the request to be provided. For example, the query may be structured to elicit a response that includes policies that are applicable to the service associated with the request (e.g., the service to which the request was submitted). Accordingly, policy applicable to the request may be obtained 408 by receiving a response to such a query.

As noted above, policy applicable to a request may be obtained from multiple sources. For example, as noted, one or more policies may be retrieved from a policy repository. As another example, one or more policies may be encoded in metadata of a resource to which the request applies. As discussed above, for instance, policies may be encoded by authorization rules. Accordingly, policy applicable to the request may be further obtained by obtaining such metadata. Such metadata may be obtained for instance by querying a service backend for such metadata. Generally any way by which policy applicable to the request is obtainable is considered as being within the scope of the present disclosure.

A determination 410 may be made to the system performing the process 400 whether to transform the request. The determination 410 whether to transform the request may be made based at least in part on policy that was obtained 408. For example, as noted above, metadata associated with the resource to which the request applies may specify whether a transformation should be made. For example, the existence of applicable request-mapping rules may serve as a signal that a transformation should be made whereas an absence of any applicable request-mapping rules may serve as a signal that a transformation should not be made. If it is determined 410 to not transform the request, the process 400 may include determining 412 whether fulfillment of the request is authorized. A determination 412 whether fulfillment of the request is authorized may be performed such as described above in connection with FIG. 3. If it is determined 412 that fulfillment of the request is not authorized the process 400 may include denying 406 the request such as described above.

Returning to the determination 410, whether to transform the request in an embodiment if it is determined 410 to transform the request, the process 400 may include determining 414 the transformed request. In an embodiment, the policy applicable to the request that was obtained 408 may include a set of mapping rules that indicate how the request is to be transformed. The request that was received 402 may be configured according to a particular syntax supported natively by a service of a service provider and the request may include information specifying one or more parameters. The mapping rules may indicate how to map such parameters into a request formatted in accordance with a different syntax. The mapping rules may further indicate which parameters should be discarded and may indicate any parameters that should be added to construct the transformed request. Generally determining 414 the transformed request may include applying mapping rules to transform the request that was received 402 into another request that utilizes a different syntax and otherwise represents an operation to be performed.

Once the transformed request has been determined 414 by the system performing the process 400, the process 400 may include determining 416 whether fulfillment of the transformed request is authorized. For example, in some embodiments, policy applicable to the request that was obtained 408 as described above may include one or more authorization rules that are evaluatable using the transformed request 414, that is, the syntax of the transformed request 414 enables evaluation of one or more authorization rules that were obtained 408 as part of policy applicable to the request. Such authorization rules may have been provided, for example, by a service backend and may be included in metadata associated with a resource to which the request that was received 402 applies.

If it is determined 416 that fulfillment of the transformed request is not authorized, the process 400 may include denying 406 the request such as described above. If it is determined 412 that fulfillment of the request is authorized or if it is determined 416 that fulfillment of the transformed request is authorized, the process 400 may include fulfilling 418 the request. The request may be fulfilled in various ways in accordance with various embodiments such as described above. In some embodiments, the request is fulfilled by processing the request that was received 402 instead of the transformed request that was determined 414. In this manner authorization decisions are generated based at least in part on the transformed request instead of the request that was received, enabling customers of the service provider to define authorization rules in terms of requests formatted in accordance with syntax that is convenient for the customers, while allowing for the utilization of computing resource services operated by a service provider.

Numerous variations of the process 400 and the process 300 described above are considered as being within the scope of the present disclosure. For example, FIGS. 3 and 4 illustrate processes whereby successful authentication is a prerequisite for determining whether fulfillment of a request is authorized. In some embodiments, determinations whether the request is authentic and whether fulfillment of the request is authorized may be performed in parallel and ultimately fulfillment of the request may require both authenticity of the request and authorization of the request.

As yet another example, FIG. 4 illustrates a process whereby an authorization determination is generated based at least in part on a transformed request instead of a request that was received in another syntax. Authorization determinations may further be based at least in part on the request that was received. For instance, in some embodiments, for fulfillment of a request to occur a system performing a process, such as a variation of a process 400, may require that both the request that was received 402 and the transformed request that was determined 414 be authorized in accordance with authorization authorized by a set of authorization rules that include a first subset of authorization rules applicable to the request that was received 402 and a second set of authorization rules that are applicable to the transformed request that is determined 414. Other variations are also considered as being within the scope of the present disclosure.

Figure 5:
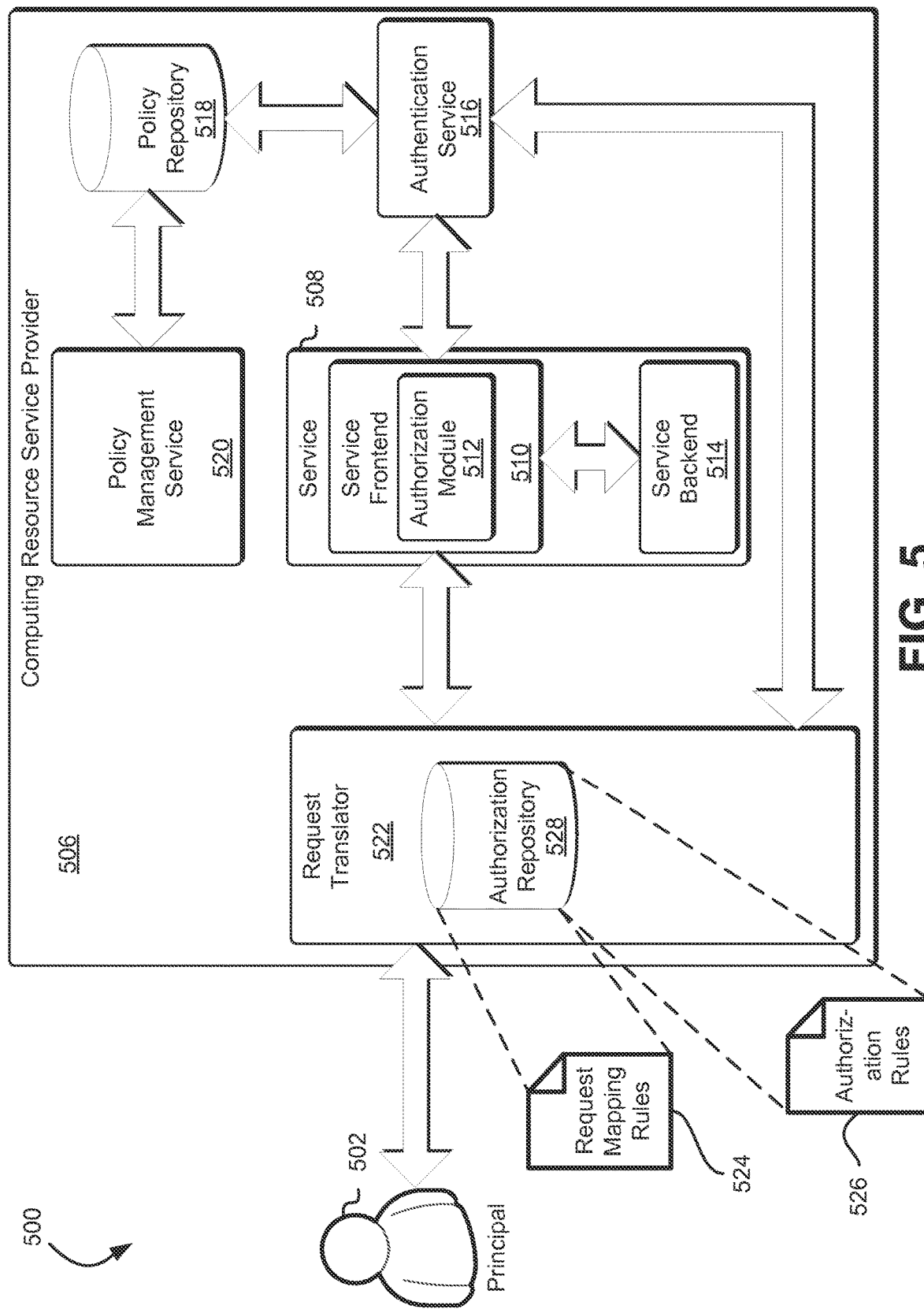
FIG. 5 shows an illustrative example of an environment in which various embodiments can be implemented.

FIG. 5 shows an illustrative example of an environment in which various embodiments can be implemented. In many ways, the environment 500 is similar to the environment 200 discussed above in connection with FIG. 2. For example, in this example, the environment 500 includes a principal 202, a computing resource service provider 506, a service 508 (with a service frontend 510 having an authorization module 512 and with a service backend 514), an authentication service 516, a policy repository 518, and a policy management service 520, such as described above in connection with FIG. 2. The principal 502 may communicate with various components of the computing resource service provider 506, as discussed above, such as over a network (not pictured).

In the environment 500, however, the computing resource service provider includes a request translator 522. The request translator 522 may be a computer system configured to receive requests and transform the requests into another syntax, such as described above. In some examples, the request translator 522 is a separate service of the computing resource service provider 506 and, as such, may include various applicable computer systems, such as web servers configured to receive requests transmitted from customers (e.g., principals associated with the customers) and process the requests. For example, as illustrated in FIG. 5, the request translator 522 may utilize the authentication service 516 discussed above. The request translator 522 may, for instance, provide an API callable by customers to configure request-mapping rules 524 and authorization rules 526 (as described above), which the request translator 522 may manage in an authorization repository 528. The authorization repository 528 may be implemented as a database that manages request-mapping rules 524 and authorization rules 526 for multiple customers (e.g., each with their own respective sets) of the computing resource service provider 506. The authorization repository 528 may be configured to associate the request-mapping rules 524 and the authorization rules 526 with appropriate information so that, when a request is received by the request translator 522, the request translator can locate applicable request-mapping rules to transform the request, locate applicable authorization rules for the request, and apply the located applicable authorization rules to the transformed request and operate accordingly. In some examples, the authorization repository 528 is the resource metadata repository discussed above while, in other examples, the authorization repository 528 is configured to manage request-mapping rules 524 and authorization rules 528 applicable to multiple services of the computing resource service provider 506.

In other examples, the request translator 522 is a network device in a network used to implement the service 508. The request translator 522 may, for instance, be situated between the principal 502 and the service frontend 510 and may perform request transformations and authorization checks, such as described above. API calls for the configuration of the request-mapping rules 524 and the authorization rules 526 may cause the service frontend 510 to update the network device to operate according to the API calls that were submitted.

Figure 6:
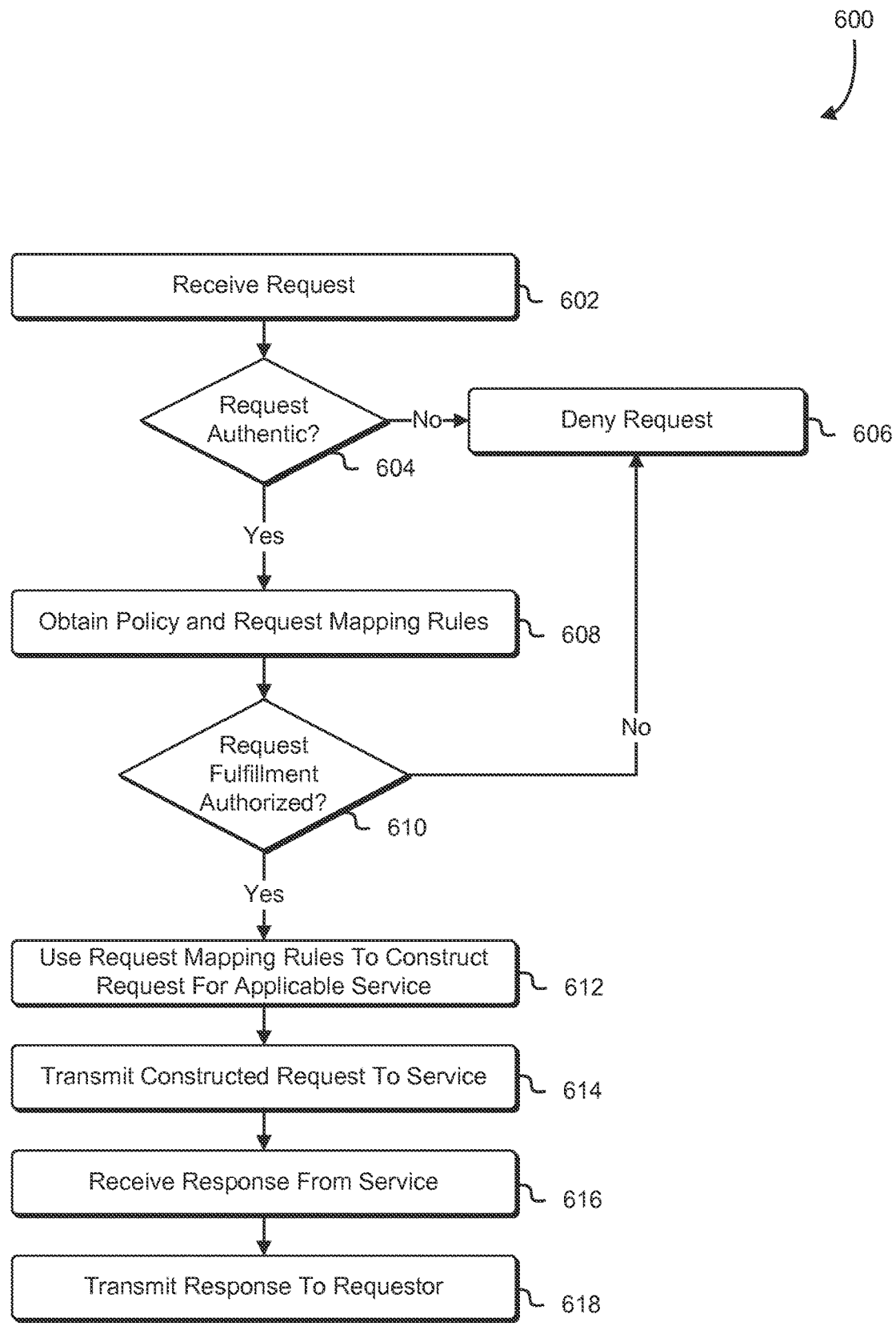
FIG. 6 shows an illustrative example for processing a request in accordance with embodiment.

As discussed above in connection with FIG. 5, variations of the techniques described herein include variations whereby a system receives a request in a syntax not natively supported by that system. For example, the request may be received in accordance with a syntax that was defined by a customer of a computing resource service provider where the request was submitted to a service of the computing resource service provider. FIG. 6 accordingly shows an illustrative example of a process 600 that may be performed to process such a request in accordance with an embodiment. The process 600 may be performed by any suitable system such as by a request translator described above in connection with FIG. 5.

In an embodiment, the process 600 includes receiving 602 a request such as described above. A determination may be made 604 whether the request is authentic. The determination 604 whether the request is authentic may be made such as described above. If it is determined 604 that the request is not authentic, the request may be denied 606 such as described above. If, however, it is determined 604 that the request is authentic, the process 600 may include obtaining policy (e.g., by way of authorization rules) and request-mapping rules that are applicable to the request that was received 602. The policy and request-mapping rules may be received in various ways in accordance with various embodiments, including ways described above.

In an embodiment, the process 600 includes determining 610 whether fulfillment of the request is authorized. The determination of whether the request is authorized may be performed such as described above and may be determined using information included in the request that was received 602. If it is determined 610 that fulfillment of the request is not authorized, the request may be denied 606 as described above. If, however, it is determined 610 that fulfillment of the request is authorized, the process 600 may include using 612 the request-mapping rules that were obtained 608 to construct a request for an applicable service. The request may be constructed as an application programming interface request according to a syntax supported by the applicable service. Construction of the request may also include generating cryptographic proof that the request is authorized. In some embodiments, the system performing the process 600 transmits the request and a digital signature of the request to an authentication service, such as described above. The authentication service, as a result of successful authentication of the request, may generate cryptographic proof of pendency of the request that was received 602. The cryptographic proof, referred to as a forward access session, may be information that is generated by the authentication service using a cryptographic key maintained as a secret by the authentication service. The cryptographic proof may, for instance, comprise encrypted information that, when decrypted, indicates the principal 502 and other relevant information, such as the applicable resource(s), a timestamp usable to determine an expiration of the cryptographic proof, the service that received 602 the request, and/or other information.

Once the request for the applicable service has been constructed 612, a system performing the process 600 may transmit 614 the constructed request to the applicable service. The request may be transmitted 614 with the cryptographic proof that was generated by the authentication service to enable the service to which the constructed 612 request is transmitted 614 to provide the cryptographic proof to the authentication service to enable the request to be submitted without the system performing the process 600 from having access to a cryptographic key of a principal that authorized the request. The service to which the constructed request was transmitted 614 may process the request accordingly, which may include performing its own authentication and/or authorization determinations and may provide a response. The response from the service may then be transmitted 618 to the requester that is the entity that submitted the request that was received 602.

In some embodiments, the response may be modified before transmission to the requester. For example, in circumstances where the applicable service denied fulfillment of the constructed request, a system performing the process 600 may transform the response indicating denial to another format such as a response indicating an error message and/or otherwise. Further, responses from the applicable service that are produced as a result of successful fulfillment of the constructed request may likewise be transformed in accordance with programming logic with which the system performed the process 600 is configured. Other variations are also considered as being within the scope of the present disclosure.

Figure 7:
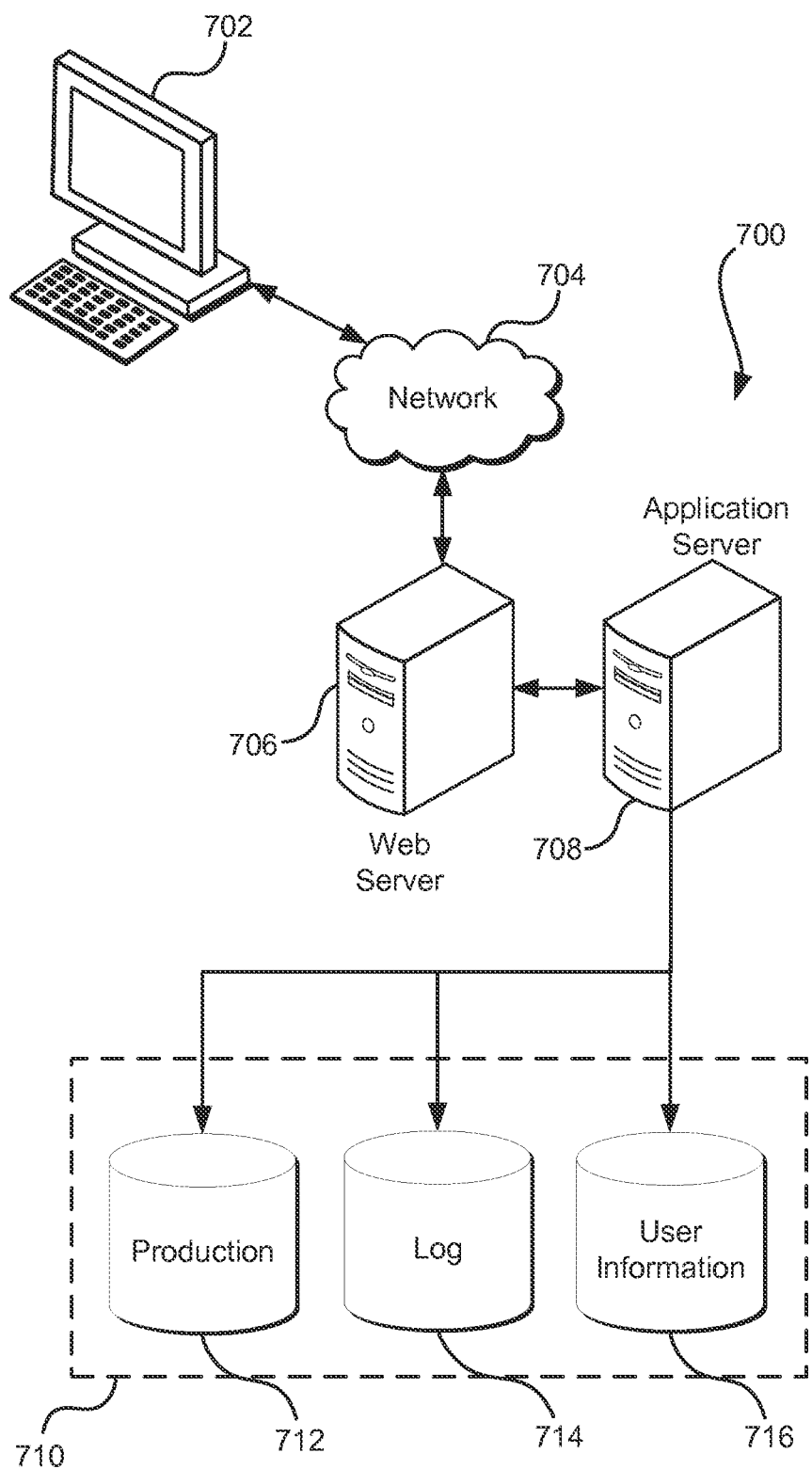
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a service, an application programming interface (API) request to access a resource hosted by a computing resource service provider, wherein the API request includes information indicating a first identifier of the resource and a first representation of an operation to perform using the resource;
   determining, based at least in part on data associated with the resource, that the first identifier and the first representation are insufficient to access a portion of the resource hosted by the computing resource service provider and the API request corresponds to a custom-defined API request, wherein the custom-defined API request is a transformed representation of the API request defined by a customer of the computing resource service provider;
   generating, based at least in part on set of mapping rules corresponding to the resource, the first identifier and the first representation, the custom-defined API request to include a second identifier of the resource and a second representation of the operation, wherein the set of mapping rules is encoded in metadata of the resource;
   causing the computing resource service provider to enforce a set of authorization rules to the custom-defined API request to determine that fulfillment of the custom-defined API request is authorized; and
   as a result of determining that fulfillment of the custom-defined API request is authorized, accessing, based at least in part on the second identifier and the second representation, the portion.

2. The computer-implemented method of claim 1, further comprising:
   obtaining a different set of requests that specify a different set of mapping rules and a different set of authorization rules; and
   fulfilling the obtained different set of requests that specify the different set of mapping rules and the different set of authorization rules by storing the different set of authorization rules in association with the resource.

3. The computer-implemented method of claim 1, wherein:
   the API request is associated with a first identity different than a second identity associated with the resource; and
   the first identity lacks permission independent of the set of authorization rules to access the resource.

4. The computer-implemented method of claim 1, wherein at least one of the set of mapping rules and at least one of the set of authorization rules were supplied on behalf of an identity associated with the API request.

5. A system, comprising:
   memory to store instructions that, as a result of being executed by one or more processors of the system, cause the system to:
      obtain, from a service, a first request type to access a resource hosted by a computing resource service provider, wherein the first request type comprises an application programming interface (API) request;
      determine, based at least in part on information associated with the resource, that the first request type is insufficient to access a portion of the resource hosted by the computing resource service provider and that the first request type corresponds to a second request type, wherein the second request type comprises a transformed API request of the API request defined by a customer of the computing resource service provider;
      identify, based at least in part on the determination, a set of mapping rules, wherein the set of mapping rules is encoded in metadata corresponding to the portion;
      generate, based at least in part on the set of mapping rules, the second request type indicating a transformed representation of the first request type;
      apply, using resources associated with the computing resource service provider, a set of authorization rules to the second request type to determine that fulfillment of the second request type is authorized; and
      provide, based at least in part on a determination that fulfillment of the second request type is authorized, access to the portion to the service.

6. The system of claim 5, wherein the instructions that, as a result of being executed by one or more processors of the system, further cause the system to:
   apply the set of mapping rules to the second request type to determine the first request type.

7. The system of claim 5, wherein the instructions that, as a result of being executed by one or more processors of the system, further cause the system to:
   obtain the API request of the first request type; and
   apply the set of mapping rules to the API request of the first request type to determine the transformed API request of the API request of the second request type.

8. The system of claim 5, wherein the instructions that, as a result of being executed by one or more processors of the system, further cause the system to:
   submit the second request type to a storage location external to the service hosting the resource, the storage location external to the service being capable of processing requests of the second request type and incapable of processing requests of the first request type.

9. The system of claim 8, wherein the system is a network device in a distributed computer system.

10. The system of claim 5, wherein the instructions that, as a result of being executed by one or more processors of the system, further cause the system to:
    obtain request type definitions; and
    the first request type is defined through an application programming interface.

11. The system of claim 5, wherein the first request type and the second request type include different syntaxes.

12. The system of claim 5, wherein the instructions that, as a result of being executed by one or more processors of the system, further cause the system to:
obtain requests of the second request type; and
fulfill the requests of the second request type.

13. The system of claim 5, wherein the instructions that, as a result of being executed by one or more processors of the system, further cause the system to:
provide the API through which mappings between request types and a set of authorization rules are definable; and
obtain, through the provided API, a definition of a mapping between the first request type and the second request type and the set of authorization rules applicable to requests of the first request type.

14. A non-transitory computer-readable storage medium comprising executable instructions that, as a result of being executed by one or more processors of a computer system, cause the computer system to at least:
obtain, in a request to access a resource hosted by a computing resource service provider, a first representation of an operation to perform with respect to the resource, wherein the first representation of the operation is an application programming interface (API) call;
determine, based at least in part on data associated with the resource, that the first representation is insufficient to access a portion of the resource hosted by the computing resource service provider and the first representation corresponds to a second representation of the operation, wherein the second representation of the operation is a transformed representation of the first representation of the operation;
identify, based at least in part on the determination, a set of mapping rules, wherein the set of mapping rules is encoded as metadata corresponding to the portion;
generate, based at least in part on the set of mapping rules, the second representation of the operation to perform with respect to the resource;
apply a set of authorization rules to the second representation of the operation to determine that fulfillment of the second representation of the operation is authorized; and
access, based at least in part on the set of authorization rules, the portion.

15. The non-transitory computer-readable storage medium of claim 14, wherein the instructions that cause the computer system to use the second representation of the operation to cause the operation to be performed, as a result of being executed by the one or more processors, cause the computer system to access the portion of the resource using an identifier of the resource in the second representation of the operation.

16. The non-transitory computer-readable storage medium of claim 14, wherein the instructions that cause the computer system to obtain the first representation of the operation to be performed, as a result of being executed by the one or more processors, cause the computer system to determine the first representation from the second representation of the operation to be performed using the set of mapping rules.

17. The non-transitory computer-readable storage medium of claim 14, wherein the instructions that cause the computer system to obtain the first representation of the operation to be performed, as a result of being executed by the one or more processors, cause the computer system to determine the second representation from the first representation of the operation to be performed using the set of mapping rules.

18. The non-transitory computer-readable storage medium of claim 14, wherein the second representation of the operation to be performed is a web service API call.

19. The non-transitory computer-readable storage medium of claim 14, wherein the instructions that cause the computer system to determine that performance of the operation is authorized, as a result of being executed by the one or more processors, cause the computer system to apply a set of authorization rules to a set of parameters in the first representation.

20. The non-transitory computer-readable storage medium of claim 14, wherein the instructions that cause the computer system to use the second representation of the operation to cause the operation to be performed, as a result of being executed by the one or more processors, cause the computer system to transmit the second representation to a service operable to perform the operation.

21. The non-transitory computer-readable storage medium of claim 14, wherein:
the instructions further include instructions that, as a result of being executed by the one or more processors, cause the computer system to determine a set of authorization rules based at least in part on information in the second representation of the operation; and
the instructions that cause the computer system to determine whether performance of the operation is authorized, as a result of being executed by the one or more processors, cause the computer system to apply the determined set of authorization rules to the first representation of the operation.

22. The non-transitory computer-readable storage medium of claim 14, wherein the first representation includes values for an operation name and a service name, the values being absent from the second representation.

* * * * *

UNITED STATES PATENT AND TRADEMARK OFFICE
CERTIFICATE OF CORRECTION

| | | |
|---|---|---|
| PATENT NO. | : 10,924,482 B1 | |
| APPLICATION NO. | : 14/576141 | |
| DATED | : February 16, 2021 | |
| INVENTOR(S) | : Gregory Branchek Roth, Eric Jason Brandwine and Graeme David Baer | |

It is certified that error appears in the above-identified patent and that said Letters Patent is hereby corrected as shown below:

In the Specification

Column 4, Line 33 to Column 5, Line 11:
Should read as:
Once the transformed operation 108 has been determined, a system that received the representation 102 of the operation may cause an authorization check 112 to be performed. An authorization check may be a determination whether fulfillment of the request representing by the representation 102 of the operation complies with any policies (which may be collectively referred to as "policy") applicable to the request. In an embodiment, the authorization check 112 however is made using the transformed representation 108 of the operation. For instance, the system performing the authorization check may apply a set of authorization rules to the transformed request, where fulfillment of the request requires satisfaction of the authorization rules applicable to the request. Conditions of the authorization rules may be configured in terms of the transformed request and/or in terms of the different identifier for the applicable resource (in this illustrative example, a data file). Application of the authorization rules to the untransformed request may result in an error or incorrect evaluation.
If the authorization check 112 results in a determination that fulfillment of the request should not occur, that is fulfillment of the request is not authorized by applicable policy, the request may be denied. As illustrated in FIG. 1 however, if the authorization check 112 indicates that the request should be fulfilled then the system that received the representation 102 of the operation may cause the operation to be performed. In an embodiment, the system causes the operation to be performed using the representation 102 of the operation that was initially received, that is, the representation 102 of the operation that is different from the representation 104 of the get request against which the authorization check 112 was performed. The representation 102 of the operation may be processed by processing the representation 102 of the operation in accordance with a syntax of the representation 102 of the operation. An operation performer 114 may then perform the operation to fulfill the request encoded by the representation 102 of the operation. The operation performer may be a computer system such as a distributed system that is configured to provide a service of a service provider, which may involve a backend system, described in more detail below. Generally, the operation performer may be the same system that received the representation 102 of the operation and/or another system. Once the operation has been performed by the operation performer 114, a result 116 may be provided Signed and Sealed this
Nineteenth Day of August, 2025

Coke Morgan Stewart
*Acting Director of the United States Patent and Trademark Office*

CERTIFICATE OF CORRECTION (continued)

U.S. Pat. No. 10,924,482 B1 as illustrated in FIG. 1. An example of such result is a file 118 identified by the path in the representation 104 of the get request.

Column 5, Lines 24-49:
Should read as:
FIG. 2 is an illustrative example of an environment 200 in which various embodiments of the present disclosure can be practiced. In an embodiment, a principal 202 may use a computing device to communicate over a network 204 with a computing resource service provider 206. Communications between the computing resource service provider 206 and the principal 202 may, for instance, be for the purpose of accessing a service 208 operated by the computing resource service provider 206, which may be one of many services operated by the computing resource service provider 206. The service 208 may comprise a service frontend 210 and a service backend 214. The principal 202 may issue a request for access to a service 208 (and/or a request for access to resources associated with the service 208) provided by a computing resource service provider 206. The request may be, for instance, a web service application programming interface request. The principal may be a user, or a group of users, or a role associated with a group of users, or a process representing one or more of these entities that may be running on one or more remote (relative to the computing resource service provider 206) computer systems, or may be some other such computer system entity, user, or process. Generally, a principal is an entity corresponding to an identity managed by the computing resource service provider, where the computing resource service provider manages permissions for the identity.

Column 7, Line 57 to Column 8, Line 24:
Should read as:
In an embodiment, the service backend 214 maintains a repository 222 of resource metadata (resource metadata repository), which may include request-mapping rules 224 and authorization rules 226. While illustrated as a single repository, the request-mapping rules 224 and the authorization rules 226 may be maintained in separate repositories. Further, while the request-mapping rules 224 and the authorization rules 226 are illustrated separately, the request-mapping rules 224 and the authorization rules 226 may be maintained together (e.g., a set of request-mapping rules and a set of authorization rules 226 for a resource may be maintained in the same database record). The request-mapping rules 224 and the authorization rules 226 may be maintained in metadata that is maintained in association with a resource. Accordingly, multiple resources may each have a corresponding set of request-mapping rules and authorization rules 226. Thus, identification of a specific resource enables location of corresponding request-mapping rules and authorization rules. As an illustrative example, the service 208 may be a data storage service that stores data objects and that organizes data objects according to logical data containers (also referred to as "buckets"). The data objects themselves and the logical data containers may each be resources managed by the service 208. The resource metadata repository 222 may, for multiple logical data containers and/or data objects, store a set of request-mapping rules 224 and authorization rules 226 in association with each logical data container and/or data object. Note that a set of request-mapping rules and a set of authorization rules may be associated with a data object indirectly by way of an association with a logical data container in which the data object is stored (i.e., by way of an association with a logical data container with which the data object is associated).

Column 11, Line 51 to Column 12, Line 9:
Should read as:
If it is determined 404 that the request is authentic the process 400 may include obtaining 408 policy applicable to the request. The policy may be obtained 408 in various ways in accordance with various embodiments. For example, referring to FIG. 2 the authentication service may provide any applicable policies in an authentication response that indicates that the response is authentic. As another example, a system performing the process 400 may submit a query to a policy repository such as described above. The system may generate the query to cause results applicable to the request to be provided. For example, the query may be structured to elicit a response that includes policies that are applicable to the service associated with the request (e.g., the service to which the request was submitted). Accordingly, policy applicable to the request may be obtained 408 by receiving a response to such a query.

Column 14, Lines 1-35:
Should read as:
In the environment 500, however, the computing resource service provider includes a request translator 522. The request translator 522 may be a computer system configured to receive requests and transform the requests into another syntax, such as described above. In some examples, the request translator 522 is a separate service of the computing resource service provider 506 and, as such, may include various applicable computer systems, such as web servers configured to receive requests transmitted from customers (e.g., principals associated with the customers) and process the requests. For example, as illustrated in FIG. 5, the request translator 522 may utilize the authentication service 516 discussed above. The request translator 522 may, for instance, provide an API callable by customers to configure request mapping rules 524 and authorization rules 526 (as described above), which the request translator 522 may manage in an authorization repository 528. The authorization repository 528 may be implemented as a database that manages request-mapping rules 524 and authorization rules 526 for multiple customers (e.g., each with their own respective sets) of the computing resource service provider 506. The authorization repository 528 may be configured to associate the request-mapping rules 524 and the authorization rules 526 with appropriate information so that, when a request is received by the request translator 522, the request translator can locate applicable request-mapping rules to transform the request, locate applicable authorization rules for the request, and apply the located applicable authorization rules to the transformed request and operate accordingly. In some examples, the authorization repository 528 is the resource metadata repository discussed above while, in other examples, the authorization repository 528 is configured to manage request-mapping rules 524 and authorization rules 526 applicable to multiple services of the computing resource service provider 506.

Column 15, Lines 36-52:
Should read as:
Once the request for the applicable service has been constructed 612, a system performing the process 600 may transmit 614 the constructed request to the applicable service. The request may be transmitted 614 with the cryptographic proof that was generated by the authentication service to enable the service to which the constructed 612 request is transmitted 614 to provide the cryptographic proof to the authentication service to enable the request to be submitted without the system performing the process 600 from having access to a cryptographic key of a principal that authorized the request. The service to which the constructed request was transmitted 614 may process the request accordingly, which may include performing its own authentication and/or authorization determinations and may provide a response. The received 616 response from the service may then be transmitted 618 to the requester that is the entity that submitted the request that was received 602.